United States Patent
Brubacher et al.

(10) Patent No.: US 7,653,916 B2
(45) Date of Patent: *Jan. 26, 2010

(54) UNIFORM RESOURCE DISCOVERY

(75) Inventors: Douglas K. Brubacher, Sammamish, WA (US); Dale A. Sather, Seattle, WA (US); Ralph Allen Lipe, Yarrow Point, WA (US); Roland J. Ayala, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 804 days.

This patent is subject to a terminal disclaimer.

(21) Appl. No.: 11/060,912

(22) Filed: Feb. 18, 2005

(65) Prior Publication Data

US 2005/0187921 A1    Aug. 25, 2005

Related U.S. Application Data

(60) Provisional application No. 60/546,671, filed on Feb. 20, 2004.

(51) Int. Cl.
*G06F 3/00* (2006.01)
*G06F 3/001* (2006.01)

(52) U.S. Cl. ................................ 719/328; 719/330
(58) Field of Classification Search ............. 718/310, 718/328, 330
See application file for complete search history.

(56) References Cited

U.S. PATENT DOCUMENTS

| | | | | |
|---|---|---|---|---|
| 5,724,506 | A  * | 3/1998 | Cleron et al. | 709/230 |
| 6,161,151 | A  * | 12/2000 | Sudhakaran et al. | 710/10 |
| 6,415,333 | B1 * | 7/2002 | Vasell | 719/315 |
| 6,853,852 | B1 * | 2/2005 | Park et al. | 455/561 |

OTHER PUBLICATIONS

Wetherall, Extending TCL for dynamic oriented programm, 1995.*

* cited by examiner

*Primary Examiner*—Lechi Truong

(57) ABSTRACT

An input including information specifying criteria for selecting computer resources is processed to produce an output comprising one or more function instances associated with computer resources satisfying the criteria. Included in each of the one or more function instances are metadata and information that specifies a mechanism for accessing a computer resource associated with the function instance.

18 Claims, 9 Drawing Sheets

| API LAYER 400 |
|---|
| CATEGORY OF UNDERLYING FUNCTION INSTANCE(S) 412
SUBCATEGORY OF UNDERLYING FUNCTION INSTANCE(S) 414
FILTER CRITERIA 416
SUPPORTED INTERFACE 418
FACTORY 420 |

FIG. 4

UNIFORM RESOURCE DISCOVERY

CROSS-REFERENCE TO RELATED APPLICATIONS

This application claims the benefit of U.S. Provisional Application 60/546,671, filed Feb. 20, 2000, which is hereby incorporated herein by this reference.

This application is related to U.S. patent application titled "Uniform Resource Discovery and Activation", U.S. Patent Application Ser. No. 11/061,268, filed Feb. 18, 2005; U.S. patent application titled "Uniform Resource Discovery and API Layering", U.S. Patent Application Ser. No. 11/060,913, filed Feb. 18, 2005; and U.S. patent application titled "Uniform Resource Discovery Provider", U.S. Application Ser. No. 11/061,291, filed Feb. 18, 2005, each of which is hereby incorporated by this reference.

TECHNICAL FIELD

The technology described herein relates generally to the uniform discovery and use of various types of computer resources.

DESCRIPTION OF THE DRAWINGS

FIG. 4 illustrates a generalized representation of one implementation of an API layer.

DETAILED DESCRIPTION

Figure 1:
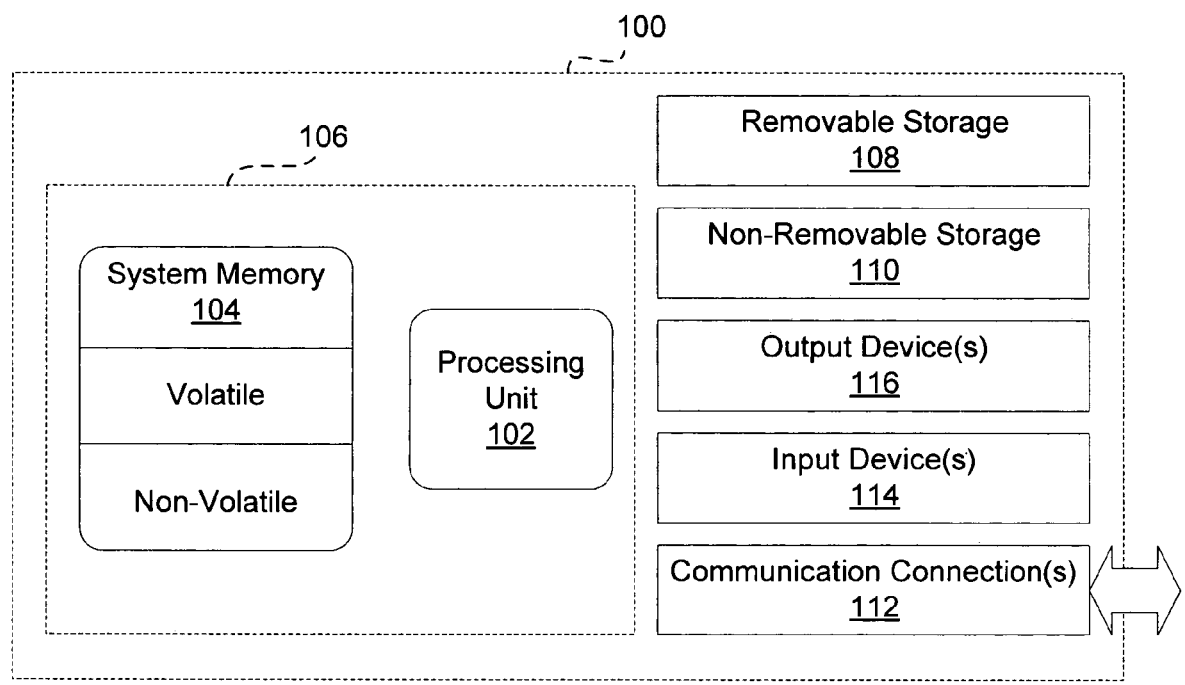
FIG. 1 illustrates an example of one possible computing device in which the various technologies described herein may be implemented.

Described herein are various technologies and techniques directed to the discovery and use of computer resources. More particularly, described herein are, among other things, systems, methods, and data structures that facilitate the discovery of, and access to, computer resources in manner that is uniform across disparate types of resources.

Included in the various technologies and techniques described herein is a unique discovery module that enables applications to retrieve information about various resources and access these resources in a uniform manner. In these implementations, the application uses the discovery module to request information about, or access to, one or more resources. In response to the request, the application receives one or more "function instances," each of which is associated with a single resource that satisfies the request.

Function instances may have various forms and formats. For example, in some implementations, a function instance is an object that includes or references metadata about its associated resources. In some implementations, a function instance also includes or references some information or mechanism by which its associated resource may be activated. As used herein, activation refers to creating or making available a programmatic mechanism, such as an API or the like, by which an application may access or use a resource.

Regardless of the particular form or format of function instances, in accordance with the various implementations described herein, function instances will in general have uniform fields, which may contain references to resource metadata and activation data, and a uniform API, enabling users of function instances to interact with function instances in the same manner, regardless of the resources represented by the function instances.

In some implementations, function instances are created using function instance providers. In these implementations, each function instance provider is associated with a given set or type of resources. In these implementations, function instance providers also include appropriate mechanisms to enumerate and create function instances for the set or type of resources associated therewith. For example, and without limitation, one function instance provider may enumerate and create function instances for Universal Plug and Play resources, another function instance provider may enumerate and create function instances for Web Service Discovery resources, yet another function instance provider may enumerate and create function instances for Simple Service Discovery Protocol resources, etc.

In some implementations, the determination as to which function instance provider is appropriate for which kinds of requested resources is made by a provider management module. In general, the provider management module keeps track of the available function instance providers. When a request for function instances is received by the provider management module, for example from the discovery module, the provider management module then selects an appropriate function instance provider to satisfy the request, and sends a request for function instances to the selected function instance provider. The function instance provider then enumerates its associated resources or otherwise queries its resources for information, creates one or more function instances to represent resources that satisfy the request, and returns the function instances to the provider management module.

In accordance with some implementations, a particular type of function instance provider, referred to herein as a mapped function instance provider, presents function instances from multiple other function providers in a uniform manner using configurable categories. Function instances provided by a mapped function instance provider may be referred to more specifically as mapped function instances.

As noted above, in some implementations, each function instance includes or references metadata for its associated resource. In some implementations, applications may access this metadata to obtain an API with which they can interact and control the resource associated with the function instance.

In some implementations, each function instance enables an application to obtain an API for the resource in a manner independent of the resource and function instance. In one such implementation, an application may request that a function instance "activate" a specific API. If the function instance supports activating the requested API, a programmatic entity (e.g., a factory object, or the like) is then created, which uses data associated with the function instance to create the requested API.

In some implementations, in the case where a particular mapped function instance represents another mapped function instance, a function instance provider may present function instances that support activating multiple APIs. In this implementation, a mapped function instance that represents other mapped function instances may support activating APIs for the function instance it represents, and also support activating APIs for the underlying function instances.

Example Computing Environment

FIG. 1 and the related discussion are intended to provide a brief, general description of an exemplary computing environment in which the various technologies described herein may be implemented. Although not required, the technologies are described herein, at least in part, in the general context of computer-executable instructions, such as program modules that are executed by a controller, processor, personal computer, or other computing device, such the computing device 100 illustrated in FIG. 1.

Generally, program modules include routines, programs, objects, components, data structures, etc., that perform particular tasks or implement particular abstract data types. Tasks performed by the program modules are described below with the aid of block diagrams and operational flowcharts.

Those skilled in the art can implement the description, block diagrams, and flowcharts in the form of computer-executable instructions, which may be embodied in one or more forms of computer-readable media. As used herein, computer-readable media 108 may be any media that can store or embody information that is encoded in a form that can be accessed and understood by a computer. Typical forms of computer-readable media include, without limitation, both volatile and nonvolatile memory, data storage devices, including removable and/or non-removable media, and communications media.

Communication media embodies computer-readable information in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communications media includes wired media such as a wired network or direct-wired connection, and wireless media such as acoustic, RF, infrared and other wireless media.

Turning now to FIG. 1, in its most basic configuration, the computing device 100 includes at least one processing unit 102 and memory 104. Depending on the exact configuration and type of computing device, the memory 104 may be volatile (such as RAM), non-volatile (such as ROM, flash memory, etc.), or some combination of the two. This most basic configuration is illustrated in FIG. 1 by dashed line 106. Additionally, the computer system 100 may also have additional features/functionality. For example, the system 100 may also include additional storage (removable and/or non-removable) including, but not limited to, magnetic or optical disks or tape. Such additional storage is illustrated in FIG. 1 by the removable storage 108 and the non-removable storage 110.

The computer device 100 may also contain communications connection(s) 112 that allow the device to communicate with other devices. The computer device 100 may also have input device(s) 114 such as keyboard, mouse, pen, voice input device, touch input device, etc. Output device(s) 116 such as a display, speakers, printer, etc. may also be included in the computer system 100.

Those skilled in the art will appreciate that the technologies described herein may be practiced with other computing devices other than the computing device 100 illustrated in FIG. 1. For example, and without limitation, the technologies described herein may likewise be practiced in hand-held devices, multiprocessor systems, microprocessor-based or programmable consumer electronics, network PCs, minicomputers, mainframe computers, and the like.

The technologies described herein may also be implemented in distributed computing environments where tasks are performed by remote processing devices that are linked through a communications network. In a distributed computing environment, program modules may be located in both local and remote memory storage devices.

While described herein as being implemented in software, it will be appreciated that the technologies described herein may alternatively be implemented all or in part as hardware, firmware, or various combinations of software, hardware, and/or firmware.

Figure 2:
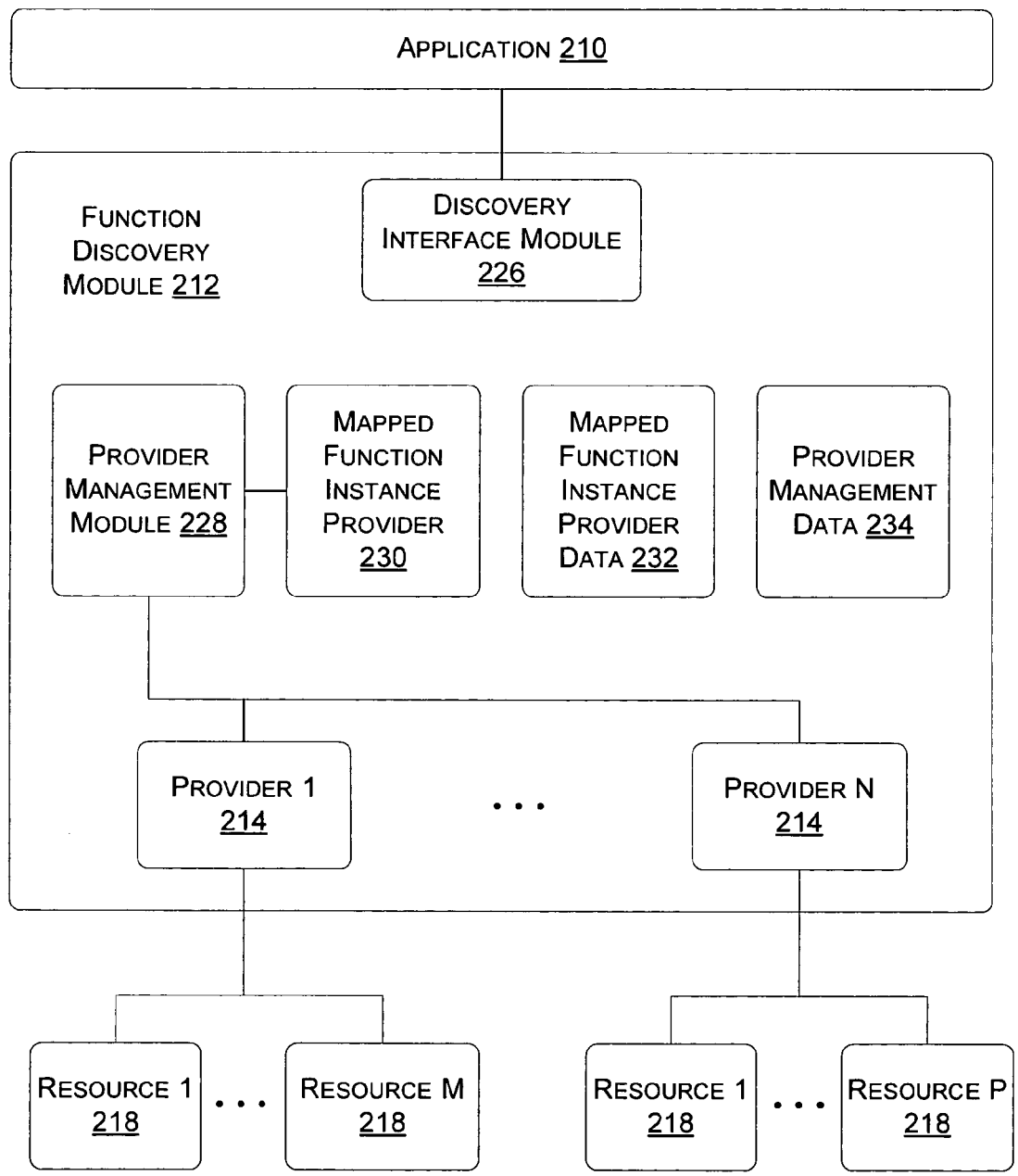
FIG. 2 illustrates one implementation of a system in which uniform resource discovery, as described herein, may be carried out.

Turning now to FIG. 2, illustrated therein is a system 200 in which uniform resource discovery may be carried out. Included in the system are an application 210, a function discovery module 212, and a number of resources 218. Generally, the application 210 may be any program, process, or the like, that is operable to interact with or control the function discovery module 212 and/or one or more resources. In general, a resource may be any hardware, software, or combination of hardware and software that provides functionality to the application.

In accordance with one implementation, the application 210 is a program that displays a graphical representation of available resources. However, those skilled in the art will appreciate that the application can be any process that is operable to communicate with or make use of any resources, for any purpose.

Included in the function discovery module 212 is a discovery interface module 226, a provider management module 228, a number of providers 214, and a mapped function instance provider 230. Also included in the function discovery module 212 are mapped function instance provider data 232 and provider management data 234.

In general, the discovery interface module 226 is a programmatic entity that provides functionality to receive requests from an application 210 and also includes various routines operable to handle the requests. In some implementations, the discovery interface module 226 is operable to communicate with the provider management module 228 to retrieve function instances in response to application requests.

For example, and without limitation, in accordance with one implementation, the discovery interface module 226 comprises an API that includes methods that enable an application 210 to request function instances for specified resources. In response to such a request, the discovery interface module 226 communicates with the provider management module 228 to retrieve function instances that represent the requested resources.

In general, the provider management module 228 is a programmatic entity that accepts requests for function instances from the discovery interface module 226. In some implementations, as described below, the provider management module uses the provider management data 234 and the one or more providers 214 and 230 to retrieve function instances, which the provider management module then returns to the discovery interface module 226.

For example, and without limitation, in accordance with one implementation, the provider management module 228 comprises executable code that responds to requests from the discovery interface module 226 by identifying a provider using information such as the provider management data 234 and the information included with the request. If a provider that can service the request is found, the provider management module 228 requests that the identified provider supply a set of function instances according to the request from the discovery interface module 226.

In general, in one implementation, the providers 214 are programmatic entities that receive requests for function instances from the provider management module 228. In response to a request from the provider management module, a provider enumerates or queries the resources with which it is associated, and creates and returns corresponding function instances to the provider management module. In some implementations, providers might also support activation of application programming interfaces.

In accordance with various implementations described herein, each provider is associated with a predefined set or type of resource. For example, and without limitation, one function instance provider may be associated with Universal Plug and Play resources, another function instance provider may be associated with Web Service Discovery resources, yet another function instance provider may be associated with Simple Service Discovery Protocol resources, etc.

The particular manner in which a provider module 228 enumerates and creates function instances may be dependent on the type of resources with which it is associated. For example, in the case where a provider module 228 is associated with Plug and Play resources, upon receipt of a request for a function instance or function instances, the provider module may use a Plug and Play-specific API to enumerate its associated Plug and Play resources. The provider module may then create and return function instances that represent the Plug and Play resources.

In some implementations, the providers 214 and 230 can be supplied by parties other than the party or parties providing the function discovery module 212.

In general, the mapped function instance provider 230 is a particular implementation of a provider 214 that supports the creation of mapped function instances. As used herein, a mapped function instance is a function instance that is associated with at least one other function instance.

The mapped function instance provider 230 receives requests for function instances from the provider management module 228. In response, it creates and returns mapped function instances and, in some implementations, does so using data from the mapped function instance provider data 232. In some of these implementations, the mapped function instance provider data 232 defines mapped function instances and specifies categorization and activation information for such mapped function instances.

For example, and without limitation, in accordance with one implementation, the mapped function instance provider 230 provides a category that supplies a single set of function instances for resources that output audio but are of different underlying types. For example, and without limitation, this category could include Plug and Play audio hardware and Universal Plug and Play media renderer devices. In some implementations, this category information is associated with the mapped function instance provider data 232.

In general, the mapped function instance provider data 232 contains data associated with the mapped function instance provider 230. For example, and without limitation, in accordance with one implementation, the mapped function instance provider data 232 may include a hierarchical set of nodes in a configuration data store (e.g., the registry in various versions of the Windows® operating system, from Microsoft Corporation of Redmond, Wash.). In addition, the mapped function instance provider data 232 may include one or more Extensible Markup Language (XML) fragments in particular nodes, where the nodes represent mapped function instance categories and the XML fragments contain information associated with mapped function instances.

In general, the provider management data 234 contains data associated with the provider management module 228. For example, and without limitation, in accordance with one implementation, the provider management data 234 is a set of XML fragments that contain information associated with function instance requests and providers 214.

It will be appreciated by those skilled in the art that the discovery interface module 226, the provider management module 228, and the various providers 214 and 230 may be implemented using various object-oriented or non-object-oriented technology. The selection of one or another type of object-oriented or non-object-oriented technology is a matter of choice, and is often determined by such things as the underlying operating system, etc.

However, in accordance with some implementations, one or more of the discovery interface module 226, the provider management module 228, and the various providers 214 and 230 are implemented as objects that conform to the Microsoft Component Object Model ("COM") specification. The COM specification defines binary standards for objects and their interfaces, which facilitate the integration of software components into applications.

Figure 3:
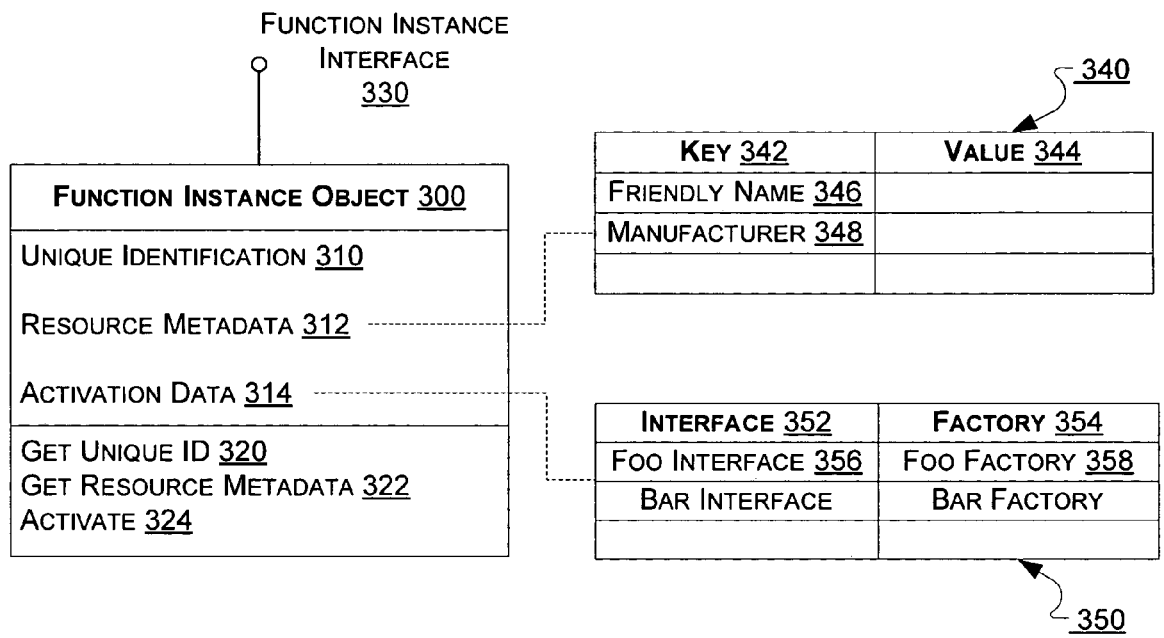
FIG. 3 illustrates a generalized representation of one implementation of a function instance.

Turning now to FIG. 3, shown therein is a generalized representation of a function instance 300. The following description of FIG. 3 is made with reference to the system 200 of FIG. 2. However, it should be understood that the function instance described with respect to FIG. 3 is not intended to be limited to being used by, or interacting with, elements of the system 200.

In general, a function instance 300 represents a resource 218, either directly (e.g., by referencing the resource directly) or indirectly (e.g., by referencing another function instance). Function instances may be used throughout the system 200 to represent and transfer resource and other function discovery information. For example, the provider management module 228 may retrieve function instances 300 from providers 214 and provide function instances to the discovery interface module 226, which provides function instances to the application 210.

A function instance 300 may be implemented as an object in an object-oriented environment and embodied in a computer-readable medium or media. However, it should be understood that the functionality described herein with respect to a function instance object 300 can also be implemented in a non-object-oriented fashion, and can be implemented on many types of systems, both object-oriented and non-object-oriented.

As shown, the function instance 300 includes a unique identification field 310, a resource metadata field 312, and an activation data field 314. Additionally, in some implementations, the function instance implements a function instance interface 330. The interface defines a set of methods that any function instance object may implement.

In the implementation of the function instance 300 shown in FIG. 3, these methods implemented include a method to retrieve data stored in the unique identification field 320, a method to retrieve resource metadata 322, and a method to activate the function instance 324.

It should be understood that, in some implementations, the information returned by the methods 320-324 may be made available directly by means, such as and without limitation, public object properties. In such implementations, the corresponding method may not be necessary. For example, if the unique identification field 310 can be retrieved by accessing the field directly, then the get unique identifier method 320 would not be necessary. Additionally, the methods may be made available directly and without the use of an interface.

The unique identification field 310 contains data that, in some implementations, uniquely identifies the function instance in a system on which the function discovery module 212 is executing. Furthermore, the unique identification field remains constant even when the function discovery module 212 or system 200 is stopped and restarted. Therefore, once an application 210 retrieves the unique identification value for a particular function instance 300, the value can be stored and later used to locate that function instance, and thereby, a particular resource.

The resource metadata field 312 contains data specific to the particular resource 218 represented by the function instance. In one implementation, the metadata may comprise a key/value table 340. In this table, the keys 342 contain identifiers that identify the information in a particular key/value pair. For example, and without limitation, keys could be "Friendly Name" 346 or "Manufacturer" 348. The value 344 associated with a particular key contains the information described by the key. For example, and without limitation, the value associated with the "Friendly Name" key 346 could be "Primary sound card," while the value associated with the "Manufacturer" key 348 could be "Company Name, Inc."

Regardless of the way in which the resource refers to a particular piece of metadata, in some implementations, the resource metadata field 312 identifies the metadata in a consistent manner through the use of standard keys 342. For example, a particular resource 218 may make its friendly name accessible using a resource-specific property called "Name," while another resource 218 may make its friendly name accessible using a method called "GetMyCommonName." In both cases, the resulting metadata could be represented in the function instance resource metadata using the same key, for example and without limitation, using "Friendly Name" 346.

It should be noted that the metadata represented by the key/value table 340 is not limited in any way to particular data. Furthermore, the key/value table 340 can be implemented using many data structures. Finally, the key/value table 340 does not necessarily comprise the entirety of the resource metadata accessible using the function instance.

When called, the get resource metadata method 322 returns the data represented by the resource metadata field 312. As discussed previously, this method may not be necessary or required if the resource metadata 312 is available through other means, such as through the use of a public property.

The activation data field 314 includes or references information used by the function instance 300 when an application 210 requests activation of the function instance. In one implementation, the activation data 314 includes or references a table 350 of application programming interfaces, or interfaces 352, that can be requested by an application 210, and corresponding factories 354 that can create entities that implement the requested interface 352. When an application 210 requests activation from a function instance, it submits with the request an interface that the entity returned by the function instance may support.

In one implementation, the activation data 350 included in or referenced by the field 314 may be examined for an entry that contains the requested interface 356. If the interface 356 exists, the corresponding factory 358 is used to create an entity that supports the requested interface. This entity is then returned to the application 210 that requested the activation. For example, an application may request an activation and specify the Foo interface 356. If the Foo interface 356 exists in the activation data 350, the corresponding Foo factory 358 is used to create an entity that implements the Foo interface.

It should be understood that while the terms "interface" and "factory" are often associated with object-oriented environments, the functionality enabled by the activation data field 314 is not limited to any particular environment or system and can also be implemented in non-object-oriented systems. Furthermore, the activation data table 350 can be implemented using many data structures. Finally, the activation data table 350 does not necessarily comprise the entirety of the activation data used or maintained by the function instance 300.

The activate method 324 uses the activation data 350 to create a factory that in turn may create an entity that supports the requested application programming interface. As discussed previously, this method may not be necessary or required if the activation data included in or referenced by the activation data field 314 is available through other means, such as through the use of a public property.

Turning now to FIG. 4, shown therein is a generalized representation of an API layer 400. In some implementations, an API layer may be a data structure embodied in a computer-readable media or medium. The following description of FIG. 4 is made with reference to the system 200 of FIG. 2, the function instance object 300 and the activation data table 350 of FIG. 2, and the tree structure 500 of FIG. 5. However, it should be understood that the API layer 400 described with respect to FIG. 4 is not intended to be limited to being used by or interacting with elements of the system 200, the function instance object 300 and the activation data table 350, or the tree structure 500.

In accordance with some implementations, the mapped function instance provider 230 uses some number of API layers 400 and a tree structure, such as the tree structure 500, to enable enhanced categorization and activation of function instances. An API layer 400 represents the information that may be used by the mapped function instance provider 230 to retrieve function instances in a particular category and also to enable activation of the retrieved function instances. In one implementation, the API layers 400 and tree structure 500 are stored in the mapped function instance provider data 232.

The API layer 400 illustrated in FIG. 4 includes a category of underlying function instance(s) field 412, a subcategory of underlying function instance(s) field 414, a filter criteria field 416, a supported interface field 418, and a factory field 420.

The category and subcategory of underlying function instance(s) fields 412 and 414 represent the category from which the function instances returned by this API layer 400 originate. The mapped function instance provider might not create any function instances that directly reference a resource 218. Instead, the mapped function instance provider 230 may create function instances that map to other function instances, including function instances created by a provider 214, or function instances created by the mapped function instance provider 230.

The category and subcategory of underlying function instance(s) fields 412 and 414 specify the base set of function instances returned using the API layer 400, before any filtering performed using the filter criteria field 416. For example, and without limitation, an API layer 400 called "Audio Endpoints Local" might contain the necessary category and subcategory to specify a set of function instances that directly map to sound hardware on the local computer system.

The filter criteria field 416 may contain or reference data by which the set of function instances returned using the API layer 400 is filtered. For a function instance to be specified by an API layer 400, it may be identified by the category and subcategory 412 and 414, and may also meet the filter criteria specified in this field, if any filter criteria information is provided.

Filter criteria can include, for example and without limitation, particular values of resource metadata properties as well as supported application programming interfaces. For example, filter criteria for audio hardware might indicate that a resource metadata property named "Device Type" has the value "Audio Hardware" and that the function instance supports the "Audio" application programming interface.

The supported interface field 418 may contain the application programming interface supported by the function instances returned using this API layer 400. Alternatively, the supported interface field 418 may contain no supported application programming interface, in which case the API layer does not in and of itself support activation. In some implementations, the data in or referenced by the supported interface field 418 populates a portion of the interface column 352 of the activation data table 350 referenced by a function instance object 300.

In these cases, because the data exists in or is referenced by the interface column 352, during activation, in some implementations the data originating in the supported interface field 418 is used as part of the process that determines if the function instance supports a requested interface.

The factory field 420 may identify a factory entity that creates entities that support the interface specified in the supported interface field 418. Alternatively, if no such factory exists, the factory field 420 may not identify a factory. As with the data in or referenced by the supported interface field 418, in some implementations, the data in or referenced by the factory field 420 populates a portion of the activation data table 350 referenced by a function instance object 300.

In some implementations, the data in or referenced by the factory field 420 populates a portion of the factory column 354 of the activation data table 350. Because the data exists in or is referenced by the factory column 354, during activation, the data originating in the factory field 420 is used as part of the process that determines the factory entity that can create an entity that supports the requested interface.

Figure 5:
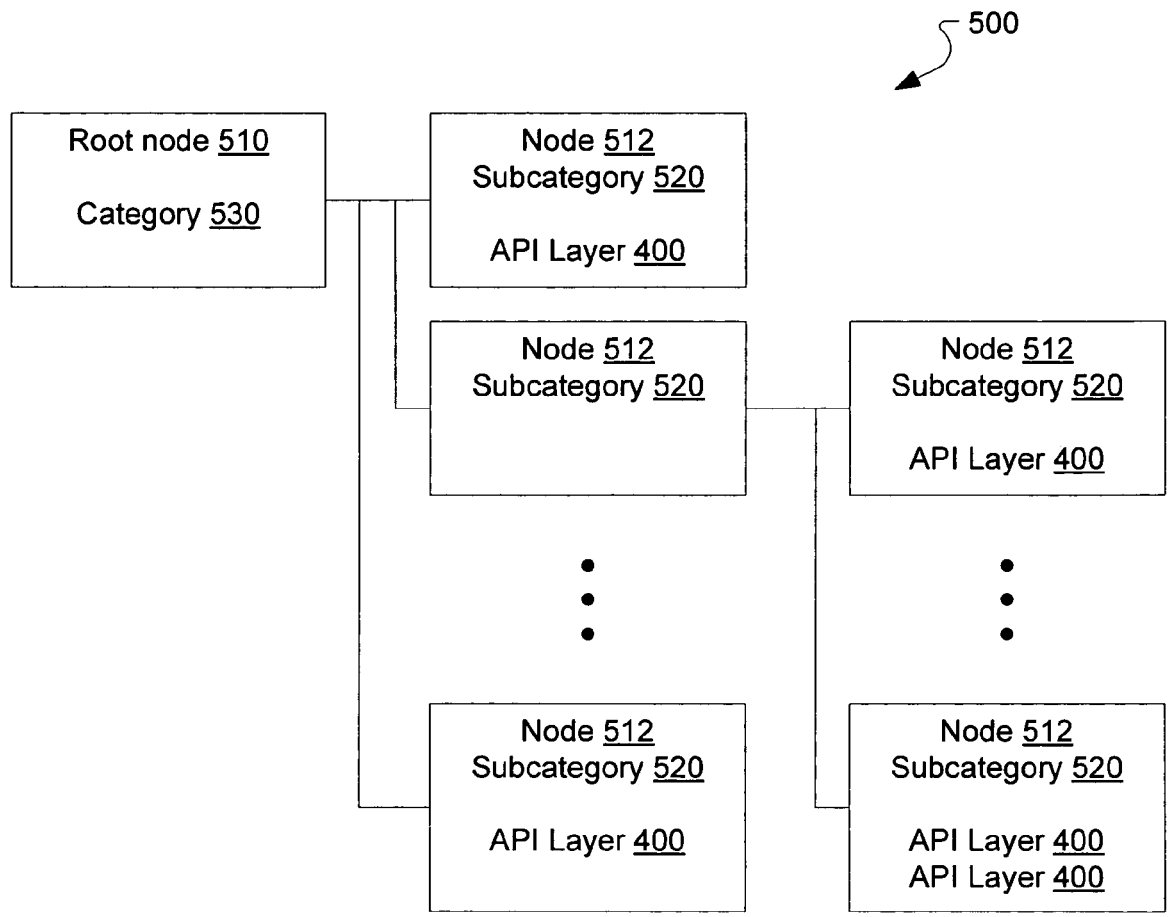
FIG. 5 illustrates a generalized representation of a tree structure that may be used by a mapped function instance provider.

Turning now to FIG. 5, shown therein is a generalized representation of a tree structure 500 which specifies categories and subcategories used by the mapped function instance provider 230. The following description of FIG. 5 is made with reference to the system 200 of FIG. 2, the function instance object 300 and the activation data table 350 of FIG. 3, and the API layer 400 of FIG. 4. However, it should be understood that the tree structure described with respect to FIG. 5 is not intended to be limited to being used by or interacting with the system 200, the function instance object 300 and the activation data table 350, or the API layer 400.

The tree structure 500 represents a conceptual model of the category and subcategory relationships that can be used by the mapped function instance provider 230. The tree structure 500 includes a root category 510, associated with the mapped function instance provider, and some number of subcategories 520.

The subcategories may be organized in a hierarchical manner as is shown in the diagram, but are not limited to this structure and may be organized in any other structure, including, but not limited to, a flat list. If the subcategories are organized in a hierarchical manner, a single subcategory may commonly be referred to using a notation such as, but not limited to, the following: "Subcategory A/Subcategory B/Subcategory C." This notation would locate subcategory C as a descendant of subcategory B, which is in turn is a descendant of subcategory A.

When an application 210 requests function instances from the discovery interface module 226 and specifies the mapped function instance provider 230, the mapped function instance provider 230 uses any provided subcategory information to locate the specified node 512 in the tree structure 500. Once the specified node 512 has been located, the function instance provider uses any API layers 400 associated with that node to generate function instances 300.

A node 512 may have zero or more API layers 400. If no API layers 400 exist for a given node, then, in some implementations, no function instances are returned when that node 512 is specified in a request for function instances. A node 512 may have multiple API layers 400. If multiple API layers 400 are specified, then in some implementations, the set of function instances returned consists of function instances from all specified API layers.

An application 210 may request that function instances 300 should be returned from the node 512 specified by the subcategory information, as well as all nodes descended from the specified node. In this case, the API layers 400 in the specified node 512 and all descendant nodes 512 are used to create function instances.

Figure 6:
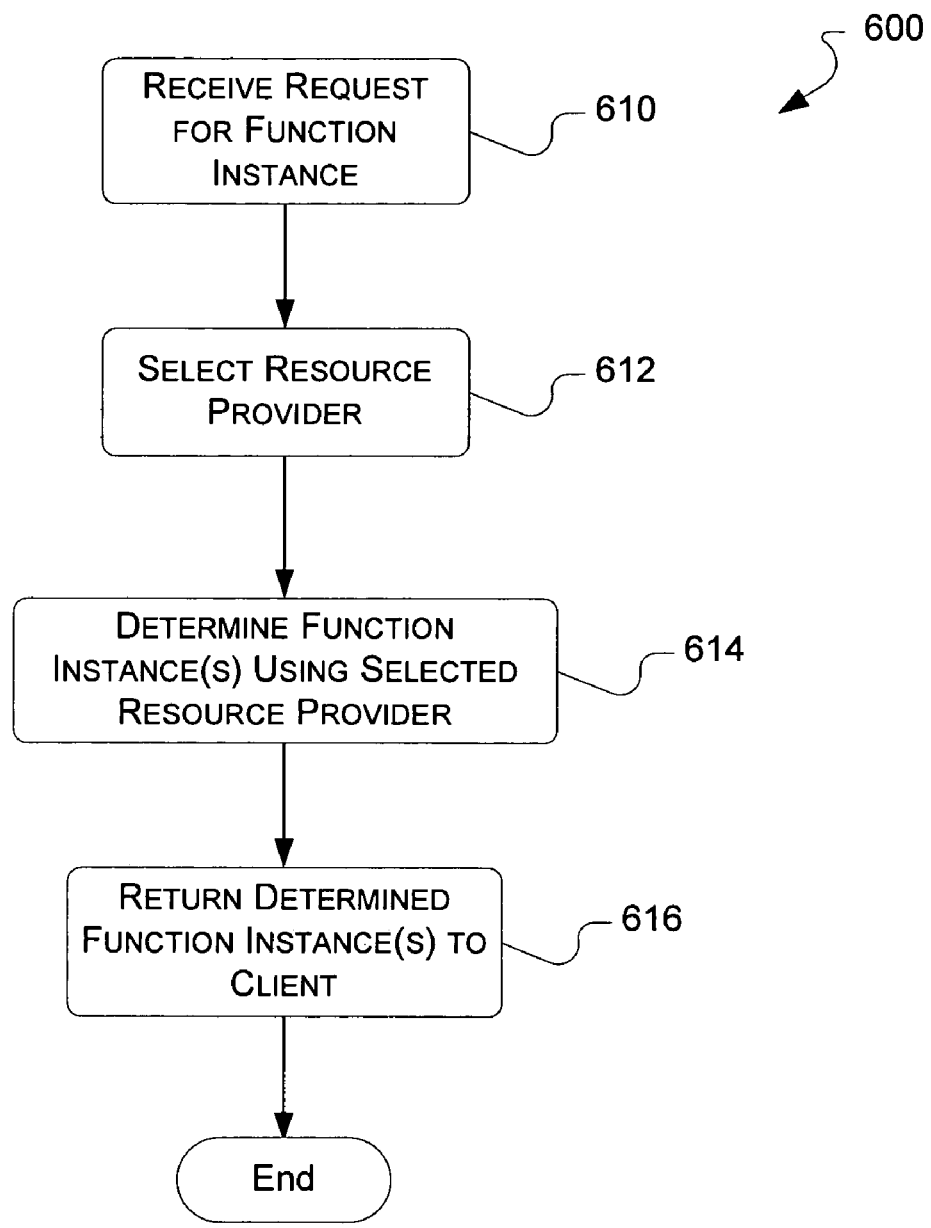
FIG. 6 illustrates a generalized operational flow including various operations that may be performed in retrieving function instances.

Turning now to FIG. 6, shown therein is a generalized operational flow 600 including various operations that may be performed in a process that retrieves function instances. The following description of FIG. 6 is made with reference to the system 200 of FIG. 2. In particular, the description of FIG. 6 is made with reference to the function discovery module 212, the provider management module 228, and a provider 214. However, it should be understood that the operational flow described with respect to FIG. 6 is not intended to be limited to being performed by the function discovery module 212, the provider management module 228, or the provider 214. Additionally, it should be understood that while the operational flow 600 indicates a particular order of operation execution, in other implementations the operations may be ordered differently.

As shown, in one implementation of operation 610 the discovery interface module 226 of function discovery module 212 receives a request for a set of function instances 300. This request may include, but is not limited to, a category; a subcategory; a tree enumeration flag that defines if only the subcategory identified by the category and subcategory information should be searched, or if all descendant subcategories should also be searched; and filter criteria that specifies how the returned function instances 300 should be filtered.

In some implementations, the function discovery module 212 dispatches the request to the provider management module 228. In one implementation of operation 612, the provider management module 228 uses the specified category to identify a provider 214 to service the request for function instances 300.

The provider management data 234 may contain information that maps categories to providers 214. A provider 214 generally corresponds to a particular type of resource. For example, and without limitation, a single provider may correspond to any of the following types of resources: Plug and Play resources, Universal Plug and Play resources, Web Service Discovery resources, Simple Service Discovery Protocol resources, and software components. Providers may also correspond to any other type of resource.

In one implementation of operation 614, the provider 214 selected in operation 612 creates and returns function instances 300 identified in the request. The steps taken by the provider 214 to obtain the information necessary for it to create function instances vary by provider. For example, a provider 214 for Plug and Play resources may use an application programming interface specific to interaction with Plug and Play resources 218 to enumerate the resources and retrieve resource metadata information about the resources.

In the case of Plug and Play resources, this application programming interface may be the SetupDi application programming interface. SetupDi is an API included with certain versions of the Windows® operating system, from Microsoft Corporation of Redmond, Wash. The SetupDi API enables accessing Plug and Play hardware. In some implementations, the mapped function instance provider 230 may use the tree structure 500 and API layer 400 data stored in the mapped function instance provider data 232 to create function instances.

Finally, in operation 616, in some implementations, the function instances 300 created by the provider are returned to the provider management module 228, then to the function discovery module 212, then to the discovery interface module 226, and finally to the application 210.

It should be noted that the provider 214 might create the function instances and return them to the provider management module 228, or it might return the data necessary to create the function instances and leave the actual creation of the function instances to the provider management module 228 or to the function discovery module 212.

it should be further noted that the provider 214 might return function instances or data asynchronously from the request for function instances. Also, the function instances 300 created by the provider 214 might not be complete—that is, they might not contain all of the information required to be contained by a function instance. In such cases, the function discovery module 212, the provider management module 228, the discovery interface module 226, or another module, might supplement the data in the created function instances 300 before the function instances are returned to the requesting application 210.

Figure 7:
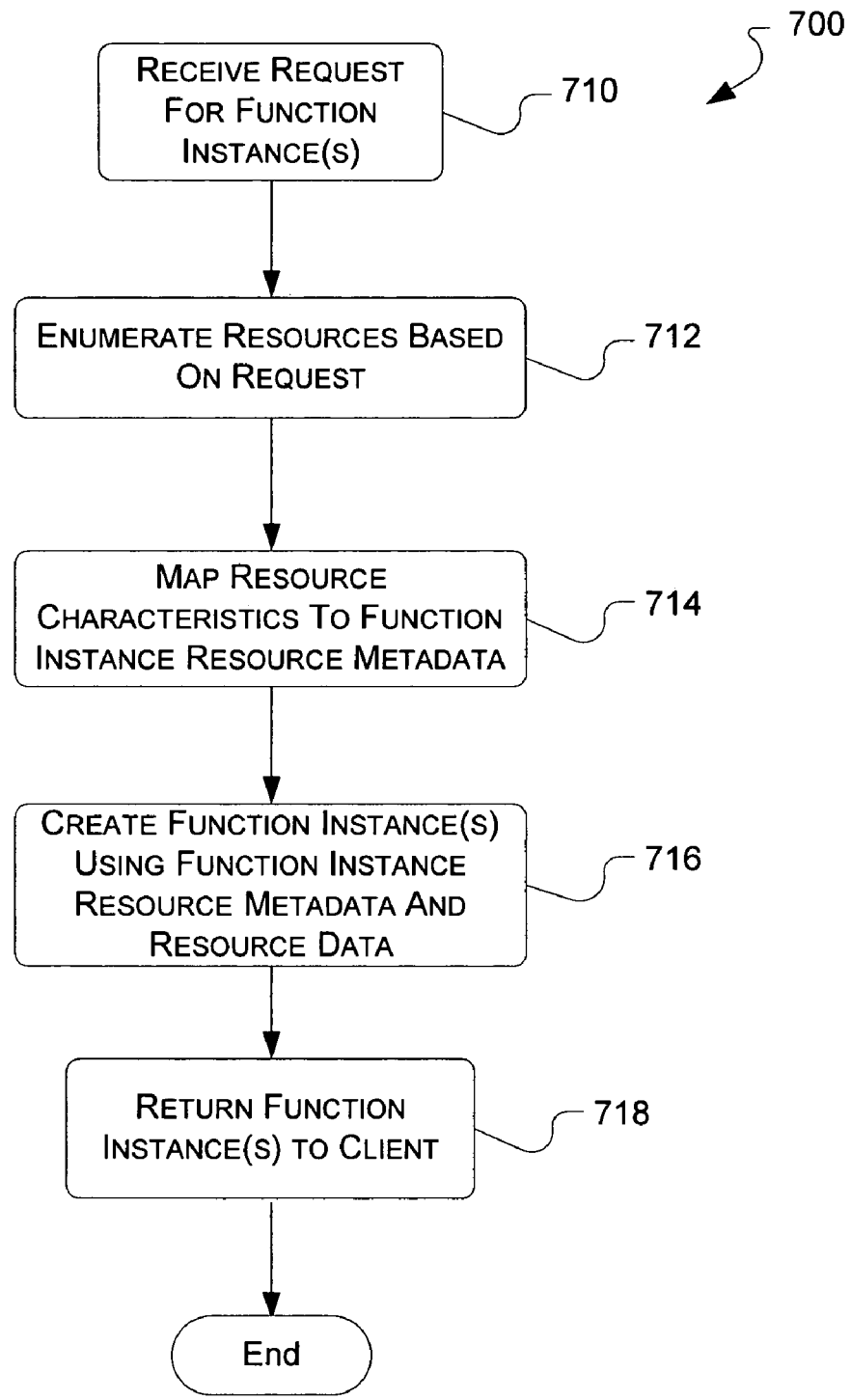
FIG. 7 illustrates a generalized operational flow including various operations that may be performed to service a request for function instances.

Turning now to FIG. 7, shown therein is a generalized operational flow 700 including various operations that may be performed by a provider 214 to service a request for function instances. In particular, the operational flow 700 illustrates operations that may be performed by a provider 214 to carry out the determination operation 614 of operational flow 600.

The following description of FIG. 7 is made with reference to the system 200 of FIG. 2. In particular, the description of FIG. 7 is made with reference to the provider management module 228, the providers 214 and resources 218. However, it should be understood that the operational flow described with respect to FIG. 7 is not intended to be limited to being performed by the provider management module 228, the providers 214, or the resources 218. Additionally, it should be understood that while the operational flow 700 indicates a particular order of operation execution, in other implementations the operations may be ordered differently.

In one implementation of operation 710, a provider 214 receives a request for function instances. The request may include, but is not limited to, a subcategory that identifies a particular set of resources on which the returned function instances should be based; a tree enumeration flag that defines if only the specified subcategory should be searched, or if all descendant subcategories should also be searched; and filter criteria that specifies how returned function instances should be filtered.

In one implementation of operation 712, the provider 214 enumerates the resources 218 with which it's associated and retrieves any information required to create function instances for such resources. The enumeration can in some cases be limited by the specified subcategory information and in the same or other cases can be limited by the specified filter criteria information.

The manner in which the provider 214 enumerates resources 218 varies depending on the nature of the resources with which the provider interacts. In some cases, the provider 214 may enumerate the resources and obtain information necessary to create function instances by using an application programming interface that is operable to manage the resources. For example and without limitation, a provider 214 for Plug and Play resources 218 may use the application programming interface known as SetupDi. Similarly, a provider for Simple Service Discovery Protocol resources may use a Universal Plug and Play application programming interface to find information about the available Universal Plug and Play or Simple Service Discovery Protocol resources, etc.

The mapped function instance provider 230 may use the tree structure 500 and API layer 400 data stored in the mapped function instance provider data 232 to create function instances. For example, if the mapped function instance provider is given a subcategory of "Subcategory A/Subcategory B," it may traverse the tree structure 500 to the node associated with subcategory B and then return function instances defined by the API layer(s) 400 associated with the node associated with subcategory AB.

Using the information retrieved in operation 712, one implementation of operation 714 maps the information to the organization and naming required by the function instance. This operation ensures that applications 210 using function instances 300 can retrieve the same information with a single name even if the underlying resources name that information differently. For example, and without limitation, information about the manufacturer of the resource could be represented by the resource-specific application programming interface using a data field called "ManufacturerName." This same information—the manufacturer—may be referred to in function instance resource metadata 312 as "Manufacturer." Operation 714 transforms resource data retrieved from the resource so that it has the organization and name expected in function instance resource metadata 312.

In one implementation of operation 716, the provider 214 creates function instances 300 for each resource identified by the request. The provider may create function instances using, among other things, the resource metadata containing mapped information generated in operation 714, any activation information known or retrieved about the resource, and any other information required to create function instances.

Finally, in one implementation of operation 718, the function instance(s) 300 the provider 214 has created are returned to the provider management module 228. It should be noted that the provider 214 might create the function instances and return them to the provider management module 228, or it might return the data necessary to create the function instances and leave the actual creation of the function instances to the provider management module 228, to the function discovery module 212, or to some other module. Also, the provider 214 might return function instances or data asynchronously from the request for function instances. In addition, not all of the information necessary to create a full and valid function instance might be provided by the provider 214. In such cases, the function instances 300 created by the provider might not be immediately usable by a requesting application 210. For example, the provider might not specify the unique identification value 210; this information might instead be provided by the provider management module 228, by the function discovery module 212, or by some other module.

Figure 8:
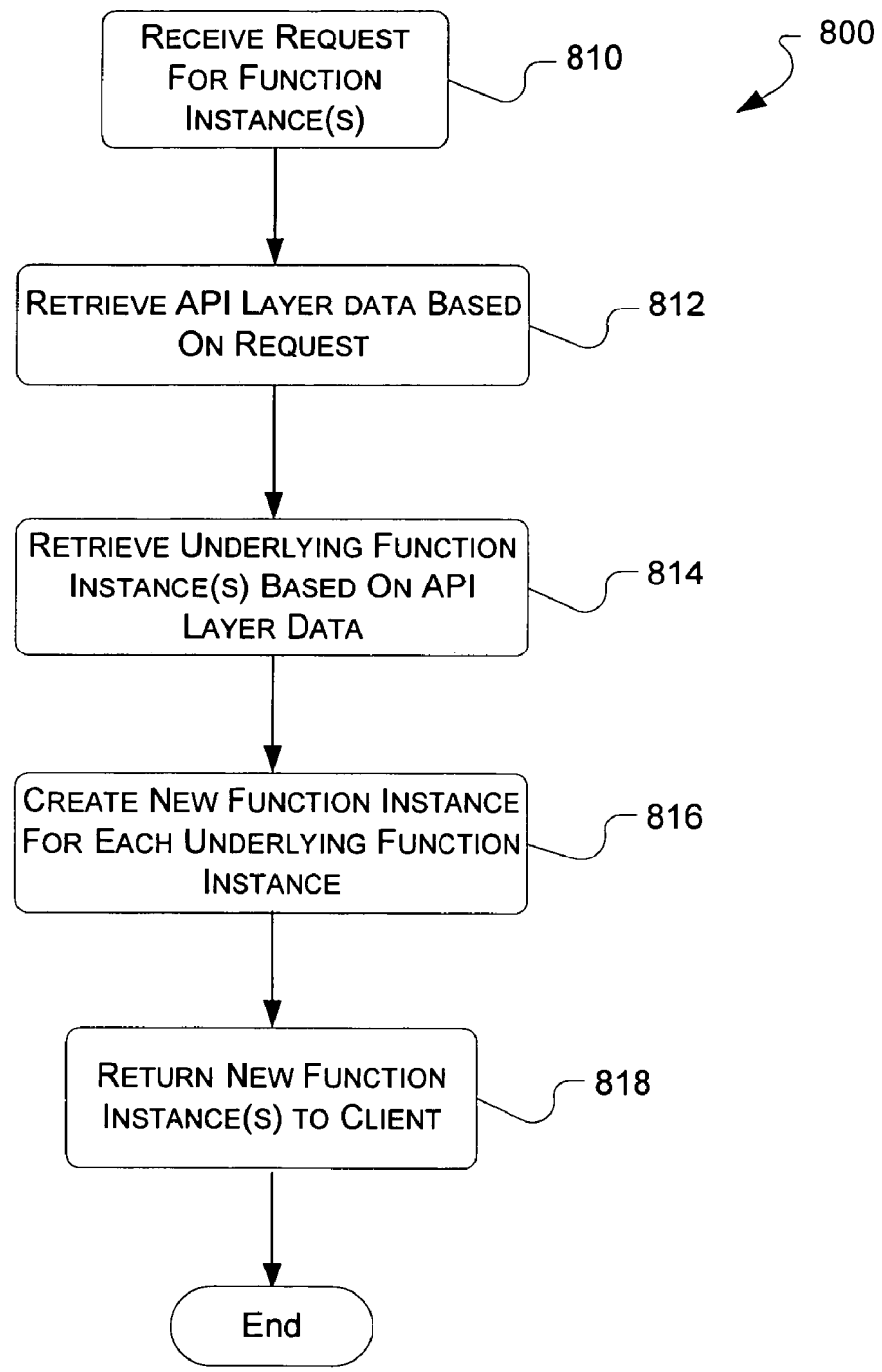
FIG. 8 illustrates a generalized operational flow including various operations that may be performed by a mapped function instance provider to service a request for function instances.

Turning now to FIG. 8, shown therein is a generalized operational flow 800 including various operations that may be performed by a mapped function instance provider 230 to service a request for function instances 300. In particular, the operational flow 800 illustrates operations that might be performed by a provider 614 to carry out the determination operation 614 of operational flow 800. The following description of FIG. 8 is made with reference to the system 200 of FIG. 2, the function instance object 300 of FIG. 2, and the API layer 400 of FIG. 4. However, it should be understood that the operational flow described with respect to FIG. 8 is not intended to be limited to being performed by the system 200, the function instance object 300, and the API layer 400. Additionally, it should be understood that while the operational flow 800 indicates a particular order of operation execution, in other implementations the operations may be ordered differently.

In one implementation of operation 810, a mapped function instance provider 230 receives a request for function instances. The request may include, but is not limited to, a subcategory that identifies a particular set of resources on which the returned function instances should be based; a tree enumeration flag that defines if only the specified subcategory should be searched, or if all descendant subcategories should also be searched; and filter criteria that specifies how returned function instances should be filtered.

In one implementation of operation 812, the mapped function instance provider 230 first locates the appropriate node 512 in the tree structure 500 maintained in the mapped function instance provider data 232. For example, a request with subcategory information "Subcategory A/Subcategory B" may define a node 512 that is located at the end of the tree path starting with the root node 510, continuing through the node 512 for subcategory A, and terminating with the node 512 for subcategory B. Once this node is located, the mapped function instance provider retrieves all of the API layer 400 data associated with the node.

Then, for each API layer 400 retrieved in operation 812, the mapped function instance provider executes operation 814, which retrieves the function instances specified in the API layer 400. The mapped function instance provider locates the function instances using the category of underlying function instances field 412 and subcategory of underlying function instances field 414.

Additionally, the function instance provider may filter the returned function instances by specified resource metadata 312 property values, or by the returned function instances by supported activation interfaces 352, or by some other data. For example, a subcategory named "Audio Hardware/Local" might have an API layer 400 with the category field "Plug and Play," the subcategory field "DevNode," and a filter on a particular Plug and Play property, so that only function instances 300 that reference audio resources are returned.

In some implementations, operation 814 may be executed multiple times when there are multiple API layers 400 associated with the node 512. In this case, the set of retrieved function instances 300 may consist of all of the function instances returned as a result of the data in each API layer. This enables a single category to contain function instances that represent similar resources, even if the underlying function instances come from different providers, different categories, or different subcategories.

Next, one implementation of operation 816 creates a new function instance for each function instance retrieved in operation 814. This new function instance may contain a new unique identifier 310 that is different from the identifier of the underlying function instance on which it is based. While the new function instance is based on the underlying function instance, it is not the same function instance, and so in some implementations warrants its own unique identifier.

The new function instance also contains resource metadata 312 that comprises both the resource metadata of the underlying function instance and the resource metadata from the API layer 400 and mapped function instance provider. For example, and without limitation, the resource metadata of the new function instance may contain a "Manufacturer" entry with information from the underlying function instance as well as a "Subcategory" entry that contains the subcategory where the API layer is located. The underlying function instance contains no information about the subcategory information associated with an API layer, but the mapped function instance provider can add this information when it creates the new function instance.

Finally, the new function instances created in operation 816 also contain activation data included in or referenced by the activation data field 314 and retrieved from the API layer 400. For example, and without limitation, suppose an API layer 400 with a supported interface field 418 that contains "Foo Interface" and a corresponding factory field 420 that defines an entity that can in turn create another entity that supports the Foo interface, based on the information in the function instance. Function instances created based on this API layer contain activation data field 314 entries that denote that the function instance supports the Foo interface and define how to create an entity that implements the Foo interface.

The activation data created in operation 816 may also contain activation information—in the form of specific interface 352 and factory 354 entries—from underlying function instances. This enables "API layering," where an API is defined in terms of another API. For example, and without limitation, suppose that an API layer contains category 412, subcategory 414, and filter criteria 416 information that specifies that the underlying function instances (also provided by the mapped function instance provider) support the "Complex Interface."

The API layer that uses these underlying function instances could then contain a supported interface field 418 that denotes that the resulting function instances support the "Simple Interface." In this case, function instances returned as a result of data in this API layer contain activation data that indicates that they support both the Simple Interface and the Complex Interface.

Figure 9:
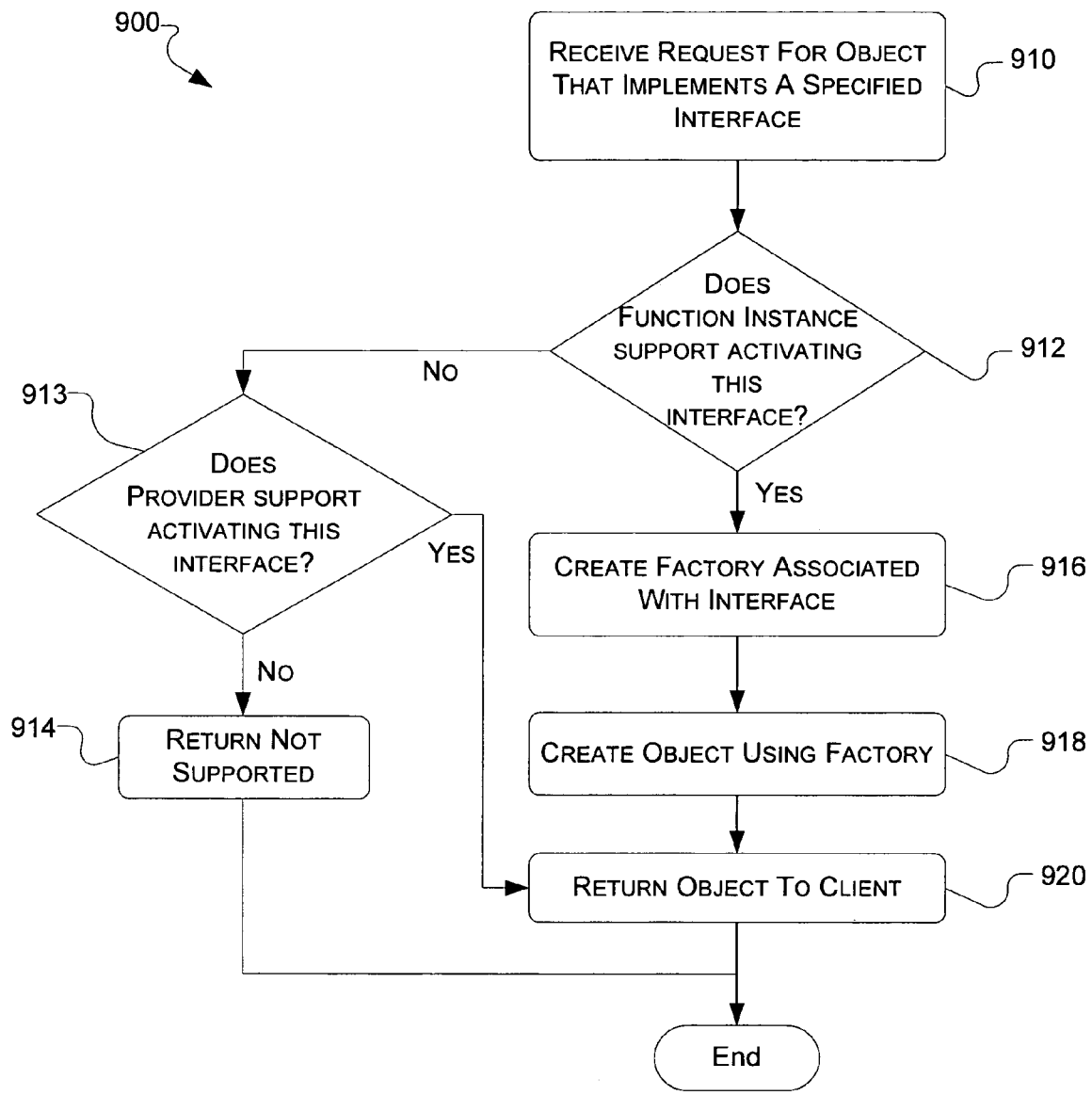
FIG. 9 illustrates a generalized operational flow including various operations that may be performed by a function instance in response to an activation request.

Turning now to FIG. 9, shown therein is a generalized operational flow 900 including various operations that may be performed by a function instance in response to an activation request. The following description of FIG. 9 is made with reference to the system 200 of FIG. 2, the function instance object 300 of FIG. 3, and the API layer 400 of FIG. 4. However, it should be understood that the operational flow described with respect to FIG. 9 is not intended to be limited to being performed by the system 200, the function instance object 300, and the API layer 400. Additionally, it should be understood that while the operational flow 900 indicates a particular order of operation execution, in other implementations the operations may be ordered differently.

In one implementation of operation 910, a function instance 300 receives an activation request for an object that supports a specified application programming interface. This request may include, but is not limited to, an interface that specifies the application programming interface the returned object supports, and a set of additional data that, if provided, can be used by function instance to control or modify the activation.

In operation 912, the function instance 300 determines if it supports activation for the requested interface. In one implementation, this test can be performed by examining the activation data 350 for the presence of the requested interface, which, if supported, will exist in the interface column 352. In this implementation, if the interface does not exist in interface column 352, the function instance does not support activation for the specified application programming interface.

If it is determined in operation 912 that the function instance 300 supports activation for the requested application programming interface, the operational flow 900 continues to operation 916, described below. If it is determined in operation 912 that the function instance does not support activation for the requested application programming interface, operational flow 900 proceeds to operation 913.

In operation 913, the provider 214 of the underlying resource 218 represented by the function instance 300 is queried to determine if the provider supports activating the requested application programming interface. If it is determined in operation 913 that the provider supports activating the requested application programming interface, the provider creates an entity that implements the requested application programming interface. The operational flow 900 then continues to operation 920, described below. If it is determined that the provider does not support activation for the requested application programming interface, operational flow 900 proceeds to operation 914.

In operation 914, the activation request indicates that the specified application programming interface is not supported by the function instance 300 or provider 214.

If the function instance 300 supports activation for the requested application programming interface, operational flow 900 continues to operation 916, where, in one implementation, the function instance creates a factory associated with the specified application programming interface. In an implementation using the activation data 350, the factory column 354 contains an identifier for a factory that creates entities that implement the requested interface. For example and without limitation, the factory column 354 in a COM-based system could contain a CLSID that uniquely identifies a COM object that can create instances of another COM object that actually implements the requested interface. Alternatively, and again without limitation, in a .NET or Java-based system the factory column 354 could contain a fully qualified object or path hierarchy that identifies a .NET or Java object that can create another object that implements the specified interface. In a non-object-oriented system the factory column 354 could contain an identifier that specifies how to create some entity that can in turn create another entity that implements the requested application programming interface.

In one implementation of operation 918, the factory created in operation 916 is used to create an entity that implements the requested interface. The factory has access to the data associated with the function instance—like the resource metadata—as well as possibly to other data, like additional parameters included in the activation request. Using this data, the factory can create an entity that implements the requested interface.

For example, and without limitation, suppose a function instance represents Plug and Play audio hardware, such as a sound card, and suppose that the activation data 314 denotes that the function instance supports an "Audio" COM interface. In one implementation, a factory object that supports creating COM objects that implement the Audio interface might use the Plug and Play SetupDi API to create an object that implements the Audio interface. Such a factory object could use the resource-specific information in the function instance 300—like an identifier that specifies which audio hardware the function instance represents—to assist in creating the object that implements the Audio interface.

It should be noted that while this description refers to a factory and to factories creating entities which in turn create other entities that implement the requested application programming interface, that the function instance 300 could refer directly to the entity that implements the application programming interface. In addition, the same entity that implements the factory may also implement the application programming interface.

Finally, in operation 920, the entity implementing the requested application programming interface is returned to the requestor. Continuing with the example introduced in the previous paragraph, and without limitation, the COM object that implements the Audio interface would be returned to the application 210, which could then use it to control and interact with the audio hardware to, for example, play audio or control volume.

Although some particular implementations of systems and methods have been illustrated in the accompanying drawings and described in the foregoing Detailed Description, it will be understood that the systems and methods shown and described are not limited to the particular implementations described, but are capable of numerous rearrangements, modifications and substitutions without departing from the spirit set forth and defined by the following claims.

What is claimed is:

1. One or more computer-readable storage media having stored thereon a plurality of instructions that, when executed by one or more processors, causes the one or more processors to perform acts including:

receiving from an application a request for one or more function instances, the request including a resource category, wherein the receiving is carried out by an application programming interface that includes methods for enabling the application to request the one or more function instances;

selecting a function instance provider from a plurality of function instance providers based on the resource category, wherein the selecting a function instance provider from a plurality of function instance providers is carried out by a provider management module; selecting one or more function instances using the selected function instance provider, each selected function instance corresponding to a resource, wherein the selecting one or more function instances includes selecting a node in a hierarchical tree structure of resource categories based on the request and retrieving function instances specified in at least one application programming interface associated with the selected node; and returning to the application, the one or more selected function instances, each selected function instance containing a metadata field and an activation field, wherein the activation field contains an indicator to a table that contains application programming interfaces for resources corresponding to the selected one or more function instances; and wherein the computer-readable storage medium comprises stored thereon a data structure of the table, the data structure comprising a plurality of interface fields, each interface field containing data representing an interface for accessing a single resource, and a factory field associated with each interface field, each factory field specifying a factory operable to create an entity that implements the interface specified in its associated interface field.

2. The one or more computer-readable storage media as recited in claim 1, wherein the request further specifies at least one interface for an entity to be returned by the requested one or more function instances.

3. The one or more computer-readable storage media as recited in claim 1, wherein the request further specifies a subcategory and wherein the selecting one or more function instances further comprises using the subcategory.

4. The one or more computer-readable storage media as recited in claim 1, wherein selecting a function instance provider from a plurality of function instance providers comprises selecting a mapped function instance provider that creates mapped function instances.

5. The one or more computer-readable storage media as recited in claim 1, wherein selecting one or more function instances further comprises creating the one or more function instances.

6. The one or more computer-readable storage media as recited in claim 1, wherein selecting one or more function instances further comprises enumerating resources associated with the selected provider using an application programming interface that is operable to manage the resources.

7. The one or more computer-readable storage media as recited in claim 1, wherein one of the function instance providers relates to at least one of Plug and Play resources, Simple Service Discovery Protocol, Universal Plug and Play resources, or Web Service Discovery resources.

8. A method comprising:

receiving from an application an input including information specifying criteria for selecting computer resources, the information including a resource category and the computer resources including one or more function instances, wherein the receiving is carried out by an application programming interface that includes methods for enabling the application to request one or more function instances processing the input to produce an output comprising at least one function instance associated with a computer resource satisfying the criteria, the function instance including resource metadata and including activation information that specifies a mechanism for accessing the computer resource, the activation information including a table of application programming interfaces for resources corresponding to the at least one function instance, wherein each of the at least one function instance includes a metadata field and an activation field that contains an indicator to the table, wherein the table comprises a plurality of interface fields, each interface field containing data representing an interface for accessing a single resource, and a factory field associated with each interface field, each factory field specifying a factory operable to create an entity that implements the interface specified in its associated interface field, and wherein the processing includes a) selecting a function instance provider from a plurality of function instance providers based on the resource category, wherein the selecting a function instance provider from a plurality of function instance providers is carried out by a provider management module, and b) selecting one or more function instances using the selected function instance provider, each selected function instance corresponding to a resource, wherein the selecting one or more function instances includes selecting a node in a hierarchical tree structure of resource categories based on the request and retrieving function instances specified in at least one application programming interface associated with the selected node; and returning the output to the application; wherein the processing is performed by a computing device comprising at least one processing unit.

9. The method as defined in claim 8, wherein the mechanism comprises a data structure specifying one or more application programming interfaces operable to access resources.

10. The method as defined in claim 8, wherein the mechanism comprises a data structure specifying one or more object factories operable to create one or more entities that provide application programming interfaces for accessing resources.

11. The method as defined in claim 8, wherein the mechanism comprises a data structure that specifies at least one interface and specifies at least one factory operable to create an entity that provides the specified interface.

12. The method as defined in claim 8, wherein the mechanism includes an activate method operable to create a factory that creates one or more entities that support the requested interface.

13. The method as defined in claim 8, wherein processing the input comprises: selecting a function instance provider from a plurality of function instance providers using the criteria; and producing the at least one function instance using the selected function instance provider.

14. A system comprising:

at least one processing unit;

a memory having stored thereon instructions that when executed by the at least one processing unit, cause the at least one processing unit to implement a receiving module that includes an application programming interface configured to receive from an application a request for function instances, the request including selection criteria that comprise a resource category, and the application programming interface including methods for enabling the application to request one or more function instances;

a plurality of function instance providers, each function instance provider configured to select function instances by selecting a node in a hierarchical tree structure of resource categories based on the resource category and retrieving function instances specified in at least one application programming interface associated with the selected node, each selected function instance associated with a particular type of resource and containing a metadata field and an activation field, the activation field containing a table of application programming interfaces for resources corresponding to the function instance and also containing activation information from other function instances underlying the function instance, the activation information comprising application programming interface entries and factory entries, and the table comprising a plurality of interface fields and a factory field associated with each interface field, each interface field containing data representing an interface for accessing a single resource, and each factory field specifying a factory operable to create an entity that implements the interface specified in its associated interface field; and wherein the memory further comprises instructions that when executed by the at least one processor cause the at least one processor to implement a provider management module configured to select one of the plurality of function instance providers based on the resource category, to produce the requested function instances.

15. The system as recited in claim 14, wherein the criteria includes a category and wherein the selection module comprises a provider management module that selects the one of the plurality of function instance providers based on associating categories with function instance providers.

16. The system as recited in claim 14, wherein the receiving module comprises an entity implementing an application programming interface including a method for accessing metadata specified by a resource metadata field.

17. The system as recited in claim 14, wherein the activation field includes data specifying a module configured to create a programmatic mechanism by which the application accesses a resource associated with the requested function instance.

18. The system as recited in claim 14, wherein one of the function instance providers is associated with Plug and Play resources.

* * * * *

UNITED STATES PATENT AND TRADEMARK OFFICE
CERTIFICATE OF CORRECTION

| | | |
|---|---|---|
| PATENT NO. | : 7,653,916 B2 | Page 1 of 1 |
| APPLICATION NO. | : 11/060912 | |
| DATED | : January 26, 2010 | |
| INVENTOR(S) | : Douglas K. Brubacher et al. | |

It is certified that error appears in the above-identified patent and that said Letters Patent is hereby corrected as shown below:

In column 17, line 48, in Claim 8, after "instances" insert -- ; --.

Signed and Sealed this
Twenty-fifth Day of January, 2011

David J. Kappos
*Director of the United States Patent and Trademark Office*